United States Patent [19]
Hadjimohammadi et al.

[11] Patent Number: 6,079,024
[45] Date of Patent: Jun. 20, 2000

[54] BUS INTERFACE UNIT HAVING SELECTIVELY ENABLED BUFFERS

[75] Inventors: Massoud Hadjimohammadi, Morgan Hill; Sunil K. Asthana, Freemont, both of Calif.

[73] Assignee: Sun Microsystems, Inc., Palo Alto, Calif.

[21] Appl. No.: 08/954,040

[22] Filed: Oct. 20, 1997

[51] Int. Cl.$^7$ ........................................ G06F 1/32
[52] U.S. Cl. ............................. 713/322; 713/600
[58] Field of Search ...................... 395/306, 308, 395/309, 750.01, 750.04, 559; 710/126, 128, 129; 713/300, 322, 600

[56] References Cited

U.S. PATENT DOCUMENTS 5,603,037  2/1997  Aybay ............................... 395/750.04
5,615,376  3/1997  Ranganathan ..................... 395/750.04
5,721,839  2/1998  Callison et al. ....................... 395/308

*Primary Examiner*—Xuan M. Thai
*Attorney, Agent, or Firm*—Conley, Rose & Tayon, PC; B. Noel Kivlin

[57] ABSTRACT

A computer system includes a bus interface with a plurality of data buffers. Each data buffer is clocked by an individual clock signal. To reduce the power consumption of the bus interface unit, the clock signals of the data buffers that are inactive are disabled during the period of inactivity. The bus interface unit includes a clock control unit that monitors a data bus coupled to the bus interface to determine when a bus cycle begins and the type of bus cycle. The clock control unit additionally monitors memory and CPU buffer signals that indicate which, if any, buffers are being accessed by the memory or CPU. From this information, the clock control unit determines which buffers are active and inactive, and outputs control signals to a clock unit to disable the clock signals associated with inactive buffers.

23 Claims, 5 Drawing Sheets

BUS INTERFACE UNIT HAVING SELECTIVELY ENABLED BUFFERS

BACKGROUND OF THE INVENTION

1. Field of the Invention

This invention relates to computer systems employing data communication busses and more particularly to power management of computer systems employing data communication busses.

2. Description of the Related Art

An ongoing developmental goal of manufacturers has been to reduce the power consumption of computer systems. Reducing power consumption typically reduces heat generation of the system, thereby increasing reliability and decreasing costs. In addition, reducing power consumption has been particularly important in maximizing the operating life of battery powered portable computer systems. Battery powered portable computer systems include personal information devices ("PIDs"), pocket personal computers, digital assistance, smart phones, and electronic calendars, organizers, booklets, etc.

Computer systems typically include data communication busses for interfacing to devices external to the processor and/or the computer system. These data communication busses allow for the efficient transfer of data between components of computer systems and provide a standardized interface to which different components may be designed. For example, a processor may include a bus interface unit (or bus bridge) that provides an interface to input/output devices.

One problem associated with typical bus interface units is the data buffers of the bus interface are clocked by the internal clock circuitry even though data is not actually being transmitted or received by the buffers. As a result, power is wasted when the buffers are in idle state. This is particularly problematic in bus interface units employed within battery powered portable computer systems.

SUMMARY OF THE INVENTION

The problems outlined above are in large part solved by a system and method for power management of a bus interface unit according to the present invention. In one embodiment, a clock control unit monitors the control signals of a data communication bus to determine when a bus cycle begins and the type of bus cycle being performed. When the clock control unit detects a pending bus cycle, the clocks to each data buffer are enabled. The clock control unit then determines the type of bus cycle being performed and disables buffers that are not used during that bus cycle. For example, if the clock control unit detects a read bus cycle, the clock control unit may disable receive buffers which are inactive during that bus cycle.

Disabling inactive buffers advantageously reduces the power consumption of the bus interface unit and accordingly reduces the power consumption of the microprocessor and computer system.

Broadly speaking, the present invention contemplates a bus interface unit coupled to a data transfer bus. The bus interface includes a first buffer, a second buffer and a clock unit. The first buffer is coupled to the data transfer bus and is configured to receive data from a device coupled to the data transfer bus and to store the data for retrieval by a processing core. The second buffer is coupled to the data transfer bus and is configured to receive data from the processing core and store the data for retrieval by a device coupled to the data transfer bus. The clock unit is coupled to the data transfer bus, the first buffer and the second buffer. The clock unit is configured to output a first clock signal to the first data buffer and a second clock signal to the second data buffer, and configured to selectively disable the first clock signal when the first buffer is inactive and to selectively disable the second clock signal when the second buffer is inactive.

The present invention further contemplates a computer system including a central processing unit coupled to a local bus, a cache coupled to the local bus, a bus interface unit coupled to the local bus and a data transfer bus, and a memory coupled to the bus interface unit. The bus interface unit includes a first buffer, a second buffer and a clock unit. The first buffer is coupled to the data transfer bus and is configured to receive data from a device coupled to the data transfer bus and to store the data for retrieval by a processing core. The second buffer is coupled to the data transfer bus and is configured to receive data from the processing core and store the data for retrieval by a device coupled to the data transfer bus. The clock unit is coupled to the data transfer bus, the first buffer and the second buffer. The clock unit is configured to output a first clock signal to the first data buffer and a second clock signal to the second data buffer, and configured to selectively disable the first clock signal when the first buffer is inactive and to selectively disable the second clock signal when the second buffer is inactive.

The present invention still further contemplates a method of reducing power dissipation in a bus interface unit coupled to a data transfer bus including: enabling clock signals to a plurality of transmit and receive buffers at the beginning of a bus cycle of the data transfer bus; decoding control signals of the data transfer bus to determine a cycle type of the bus cycle; determining which of the plurality transmit and receive buffers are inactive during the bus cycle; and disabling clocks signals to the transmit and receive buffers that are inactive during the bus cycle.

BRIEF DESCRIPTION OF THE DRAWINGS

Other objects and advantages of the invention will become apparent upon reading the following detailed description and upon reference to the accompanying drawings in which.

Figure 1:
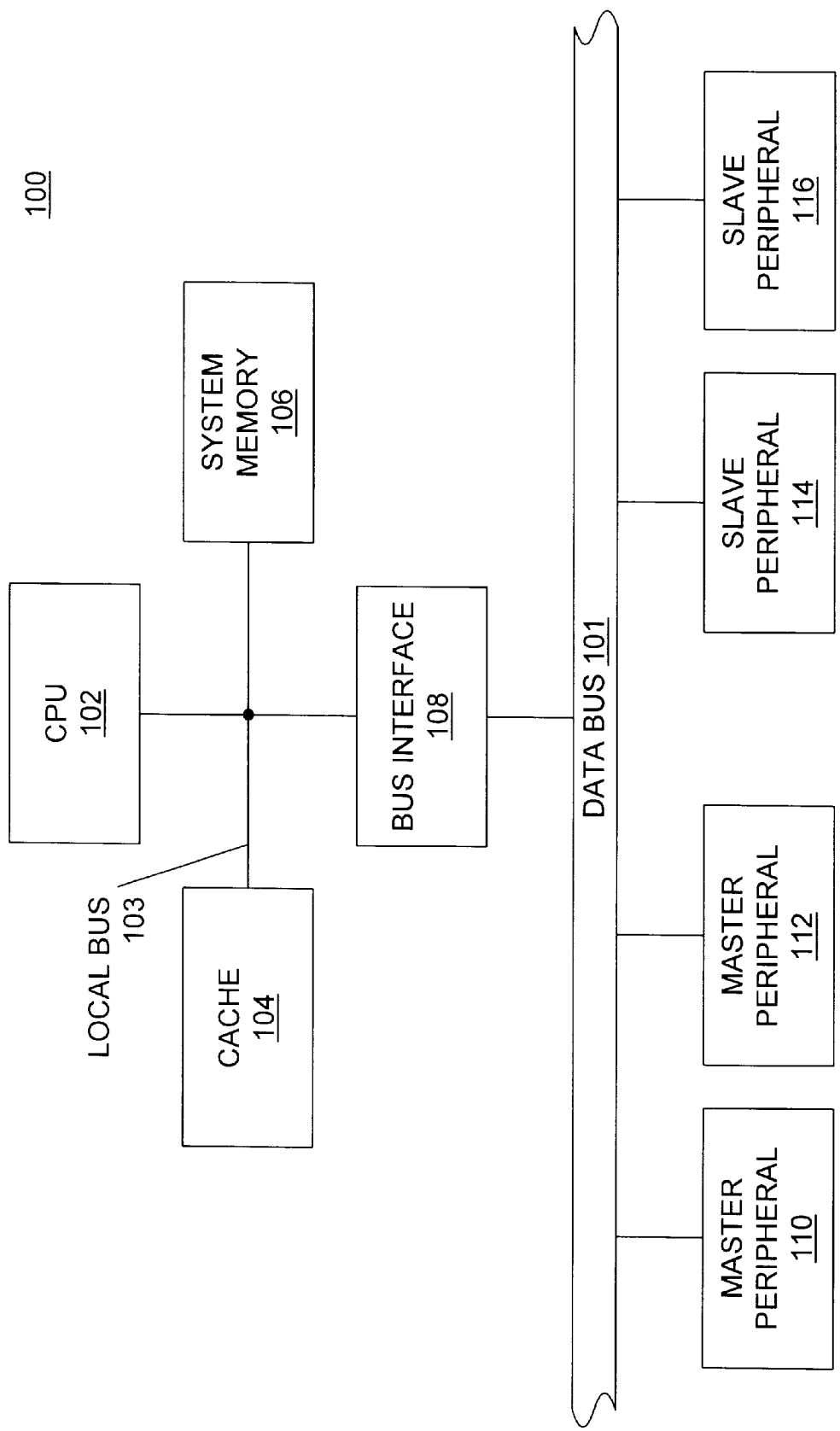
FIG. 1 is a block diagram of a computer system according to one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a computer system 100 according to one embodiment of the present invention is shown. Computer system 100 includes a data bus 101, a central processing unit (CPU) 102, a cache 104, a system memory 106, a bus interface 108, master peripheral devices 110 and 112, and slave peripheral devices 114 and 116. CPU 102 is coupled to cache 104, system memory 106, and bus interface 108 via a local bus 103. Bus interface 108 is further coupled to master peripherals 110 and 112 and slave peripherals 114 and 116 via data bus 101. CPU 102 may be any of various types to processing units. For example, CPU 102 may be from the SPARC family of RISC processors, an x86 processor, a Power PC processor, as well as others. System memory 106 stores operating system software and the software for operation of the computer system, as well known to those skilled in the art. Cache 104 stores recently accessed blocks of data from system memory 106. Cache 104 is typically smaller and faster that system memory 106.

Bus interface 108 provides an interface between local bus 103 and data bus 101. Data bus 101 is preferably a peripheral component interconnect (PCI) bus, although other bus types may be used such as an industry standard architecture (ISA) bus or an extended industry standard architecture (EISA) bus. Bus interface 108 provides the interface to translate control and data signals from host bus 103 to data bus 101. In the illustrated embodiment, two master peripheral devices and two slave peripheral devices are coupled to data bus 101. In one embodiment, master peripheral devices may initiate a bus cycle on data bus 101. In one embodiment, slave peripheral devices may respond to a bus cycle on data bus 101, but may not initiate a bus cycle on data bus 101. For example, master peripheral 110 may be a data consuming device such as a video display card. When master device 110 requires data from CPU 102 or system memory 106, master device 110 may initiate a bus transfer cycle on data bus 101 requesting data via bus interface 108. Alternatively, if master device 110 is a data producing device, such as a video camera, master device 110 may initiate a bus cycle on data bus 101 to transfer data from master device 110 to either CPU 102 or system memory 106 via bus interface 108. Slave devices 114 and 116 may also be data producing or data consuming devices, but the slave devices may only respond to a bus cycle initiated by a bus master such as bus interface 108, master device 110 or master device 112.

Figure 2:
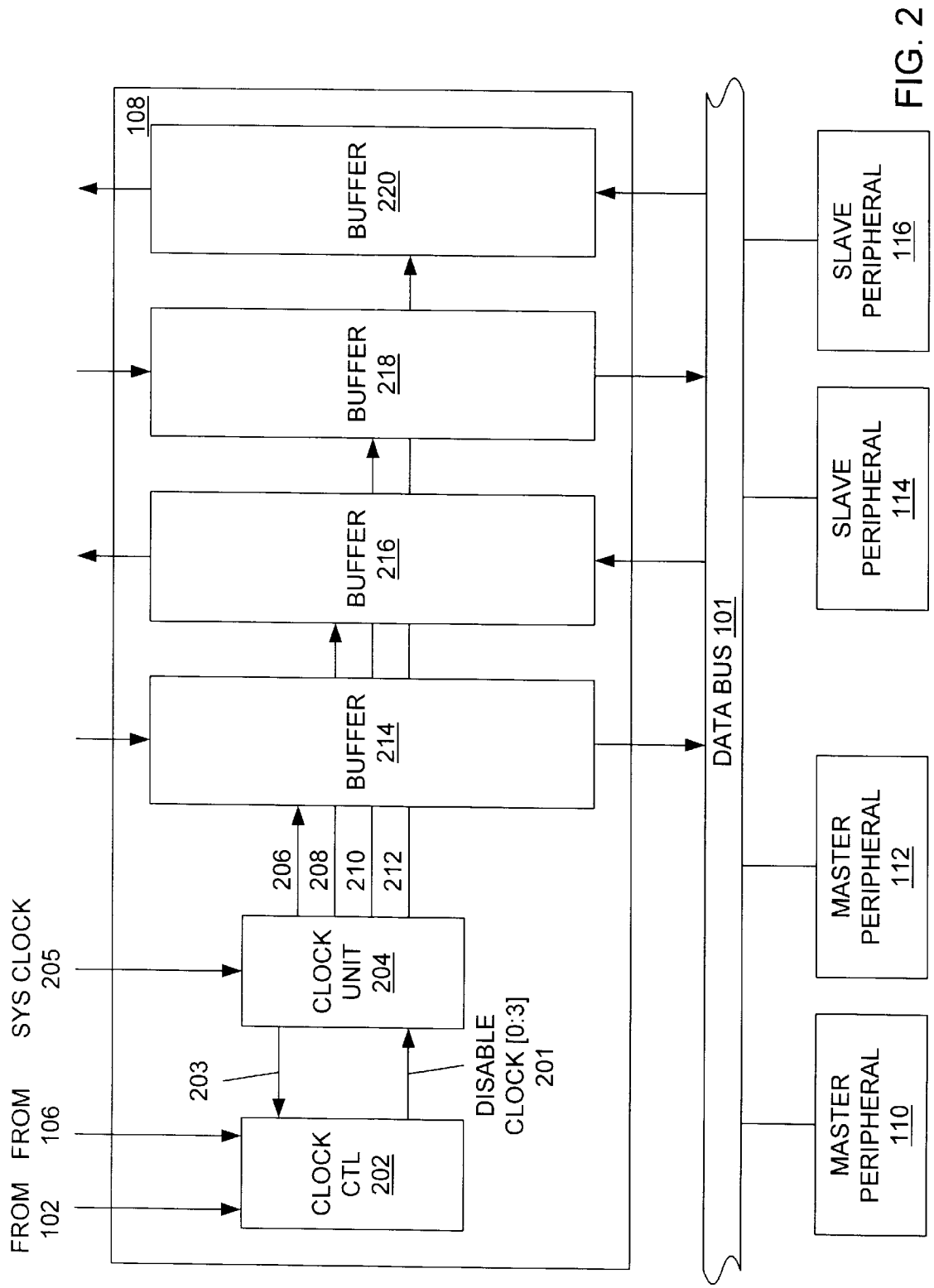
FIG. 2 is a block diagram of portions of a bus interface, a data communication bus and peripheral devices according to one embodiment of the present invention.

Turning now to FIG. 2, portions of bus interface 108, data bus 101 and peripheral devices 110–116 are shown. The elements of bus interface 108 not necessary to understand the operation of the present invention have been admitted for simplicity. In the illustrated embodiment, bus interface 108 includes clock control unit 202, clock unit 204, and buffers 214 through 220. Clock control unit 202 is coupled to control signals of data bus 101 and control signals from CPU 102 and memory 106. Clock control unit 202 outputs one or more disable clock signals on disable clock signal conductor 201. Clock unit 204 receives a system clock signal on system clock signal line 205. Clock unit 204 outputs a control clock signal on a control clock signal line 203 to clock control unit 202. Clock unit 204 additionally outputs receive clock signals and transmit clock signals to transmit buffers 214 and 218 and receive buffers 216 and 220. In the illustrated embodiment, clock unit 204 outputs a first transmit clock signal on transmit clock signal line 206 and a second transmit clock signal on transmit clock line 210. Clock unit 204 further outputs a first receive clock signal on receive clock signal line 208 and second receive clock signal on receive clock signal line 212.

Bus interface 108 includes a plurality of data buffers for temporarily storing data. In the illustrated embodiment, bus interface 108 includes two transmit buffers (214 and 218) and two receive buffers (216 and 220). Transmit buffer 214 receives data from system memory 206 and outputs data to data bus 101. Receive buffer 216 receives data from data bus 101 and outputs the data to system memory 106. Transmit buffer 218 receives data from CPU 102 and outputs data to data bus 101. Receive buffer 220 receives data from data bus 101 and outputs data to CPU 102. In one particular embodiment, buffers 214–220 are first-in/first-out (FIFO) buffers. The use of four data buffers advantageously permits multiple devices to access data at one time. Although only one buffer may be transmitting or receiving data from data bus 101 at one time, system memory 106 or CPU 102 may read data from the buffers or write data to the buffers concurrently with the bus transaction. For example, master device 110 may initiate a bus cycle in which data is stored to buffer 216. Concurrently, system memory 106 may store data to buffer 214 and CPU 102 may read data from buffer 220. In this manner, three separate data transfers are performed concurrently.

Clock unit 204 provides an independent clock to each buffer of bus interface 108. At any instant of time, one or more data buffers are typically inactive. By selectively disabling the clock signals of inactive buffers, the power consumption of bus interface 108 may be reduced.

Clock control unit 202 receives control signals from data bus 101 indicating when a bus cycle is initiated on data bus 101 and the type of bus cycle initiated on data bus 101. Clock control unit 202 additionally receives a memory buffer signal on memory buffer signal line 222 and a CPU buffer signal on a CPU buffer signal line 224 identifying which, if any, of the data buffers are being accessed by either system memory 106 or CPU 102. Based upon these controls signals, clock control unit 202 determines which buffers are active and which buffers are inactive. Clock control unit 202 outputs one or more disable clock signals on disable clock signal conductor 201. Clock unit 204 receives the disabled clock signals and disables the clocks to the inactive buffers.

Figure 3:
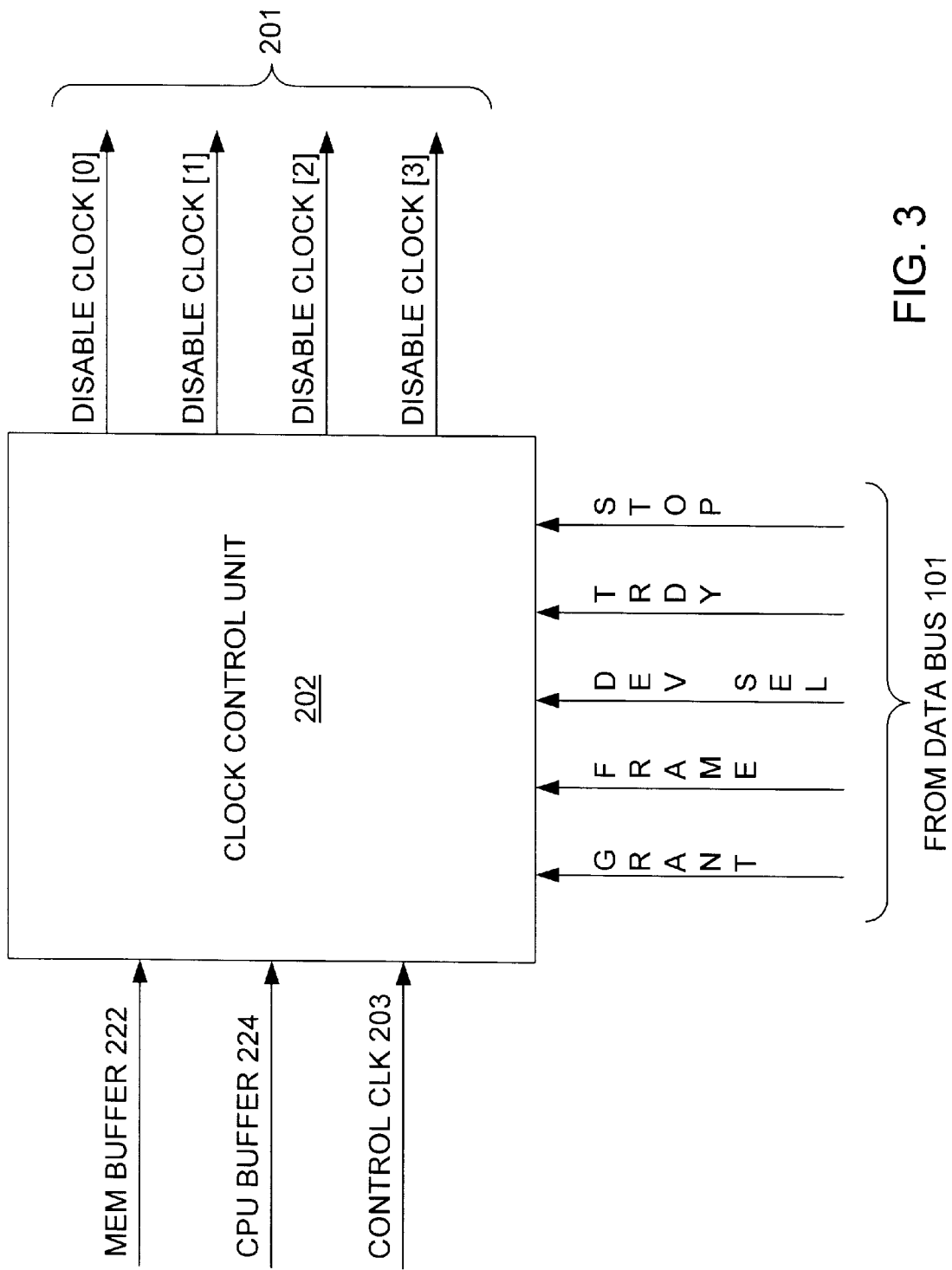
FIG. 3 is a block diagram illustrating input and output signals to a clock control unit according to one embodiment of the present invention.

Turning now to FIG. 3, a diagram illustrating the input and output signals of clock control unit 202 is shown. In one embodiment, clock control unit 202 is a conventional finite state machine. In other embodiments, any conventional circuit which maps a sequence of input events into a sequence of output events is contemplated. In the illustrated embodiment, clock control unit 202 receives a system clock signal on system clock signal line 205 which provides a timing signal to the state machine. As discussed above, clock control unit 202 additionally receives a memory buffer signal on memory buffer signal line 222 that identifies the buffers being accessed by system memory 106. Clock control unit 202 additionally receives a CPU buffer signal on CPU buffer signal line 224 that identifies the buffers being accessed by CPU 102. Clock control unit 224 still further receives control signals from data bus 101 that indicate when a bus cycle is initiated and the type of bus cycle initiated. Clock control unit 202 outputs one or more disable clock signals on disabled clock signal conductor 201. The disabled clock signals indicate which buffers are inactive and may be used by clock unit 204 to disable the clocking signals to the inactive buffers.

In one embodiment, clock control unit 202 enables the clock signals of all buffers at the beginning of a bus cycle.

Because it may take a finite period of time to enable the clock signal and a finite period of time after the bus signal is enabled for the buffer to be prepared to transmit or receive data, each buffer is enabled at the beginning of a clock cycle. In this manner, each buffer is prepared to receive or transmit data when the bus cycle begins. Clock control unit 202 then determines the type of bus cycle and disables the clocks to buffers that are inactive during that bus cycle.

As discussed above, CPU 102 or system memory 106 may access buffers concurrently with buffers being accessed by data bus 101. Accordingly, clock control 202 additionally receives memory buffer and CPU buffer signals indicating which buffers are being accessed by those devices. Based upon the type of bus cycle and the buffers currently being accessed by the CPU and system memory, clock control unit 202 determines which buffers are active and which buffers are inactive. Clock control unit 202 asserts the disabled clock signals that correspond to the inactive buffers. In one particular embodiment, if the CPU or memory begins accessing a buffer during a bus cycle, clock control unit 202 enables the clock signal associated with that buffer. Because a finite time may exist between enabling the clock and the buffer being ready to receive or transmit data, the memory buffer signal and the CPU buffer signal may be required to be activated a finite time prior to the buffer being accessed.

In one embodiment, data bus 101 is a peripheral component interconnect (PCI) bus. In one particular embodiment, clock control unit 202 receives a grant signal, a frame signal, a device select (DEVSEL) signal, a target ready (TRDY) signal and a stop signal from data bus 101. The assertion of the grant signal indicates the beginning of a clock cycle. When clock control unit 202 detects the assertion of the grant signal, clock control unit 202 deasserts the disable clock signals. As used herein, the terms "asserted" or "deasserted" may refer to positive logic wherein "asserted" is a logical high or a logical one, or negative logic in which "asserted" is logical low or logical zero. In one embodiment, when the clock disable signals are deasserted, the clock signals to buffers 214–220 are enabled. The DEVSEL signal indicate that a device has decode the address and is selected. In a subsequent clock cycle the bus command signals may be monitored to determine the type of transaction.

Clock control unit 202 monitors the target ready signal to determine the end of the bus cycle. When clock control unit 202 detects the end of the bus cycle, clock control unit 202 asserts the disabled clock signals associated with each buffer not being accessed by either the memory or CPU. Clock control unit 202 additionally monitors the stop signal. The stop signal indicates that the bus cycle is aborted and clock control unit 202 treats the stop signal like an end of bus cycle.

Figure 4:
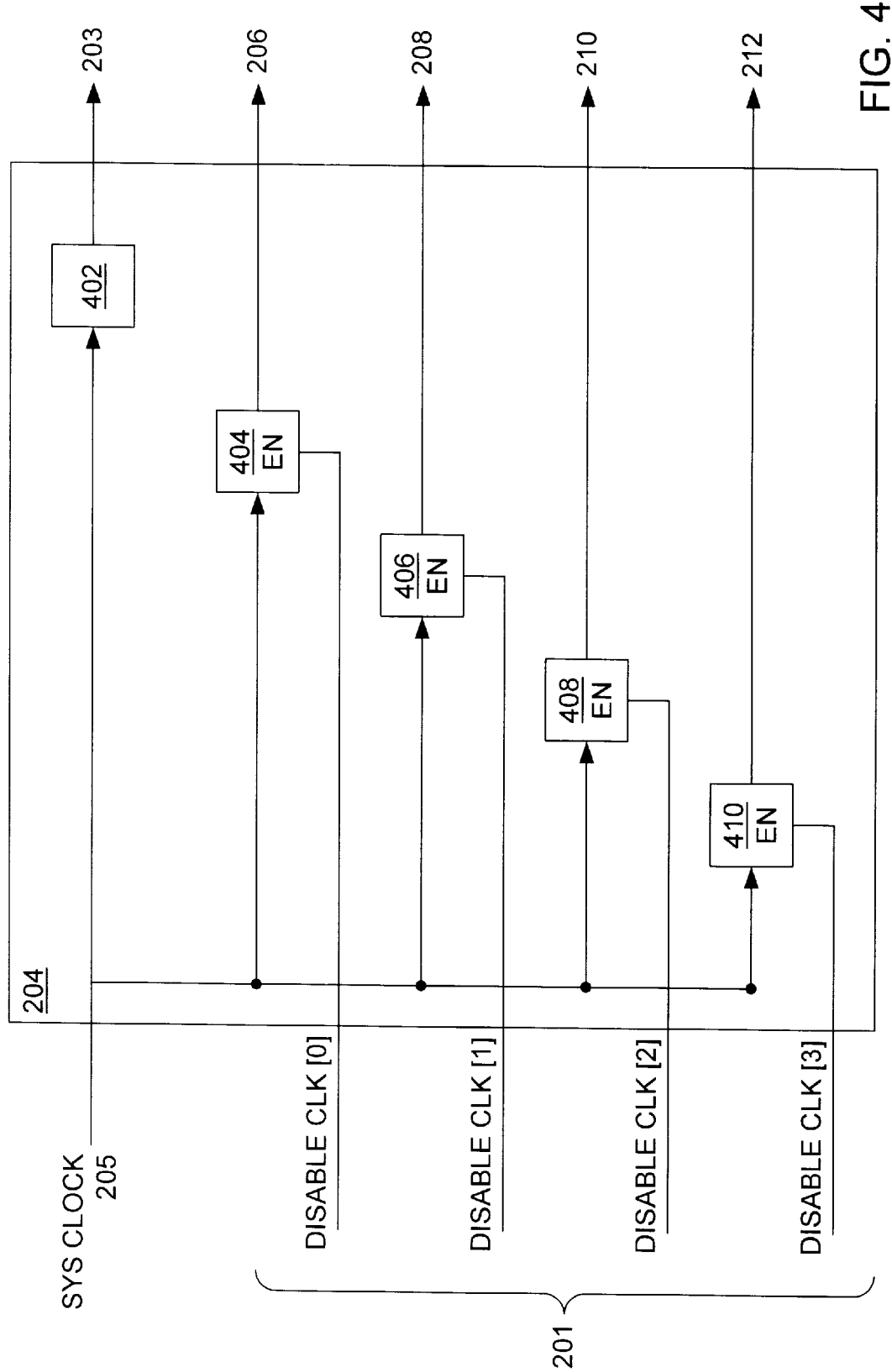
FIG. 4 is a block diagram of a clock unit according to one embodiment of the present invention.

Turning now to FIG. 4, a block diagram of clock unit 204 according to one embodiment of the present invention is shown. In the illustrated embodiment, clock unit 204 includes a plurality of buffers 404–408. Clock unit 204 partitions the system clock signal on system clock signal line 205 into five separate clock signals. The system clock signal is coupled to an input of buffers 404–408. The output of each buffer is a separate clock signal. In one embodiment, the separate clock signals are synchronized. Control signals of buffers 404–408 are coupled to the disable clock signals received on disabled clock signal conductor 201. Each disable clock signal enables or disables a buffer. For example, if disable clock signal 0 is deasserted, buffer 404 buffers the system clock signal received on system clock signal line 205 and outputs a transmit clock on line 206. If disabled clock signal 0 is enabled, buffer 404 is disabled and no clock signal is output on transmit clock line 206 (i.e. the clock signal is disabled). In a similar manner, disable clock signal 1, disable clock signal 2 and disable clock signal 3 control buffers 404, 406 and 408, respectively. In the illustrated embodiment, the control signal of buffer 402 is always asserted and a buffered version of the system clock is output on control clock conductor 203.

Figure 5:
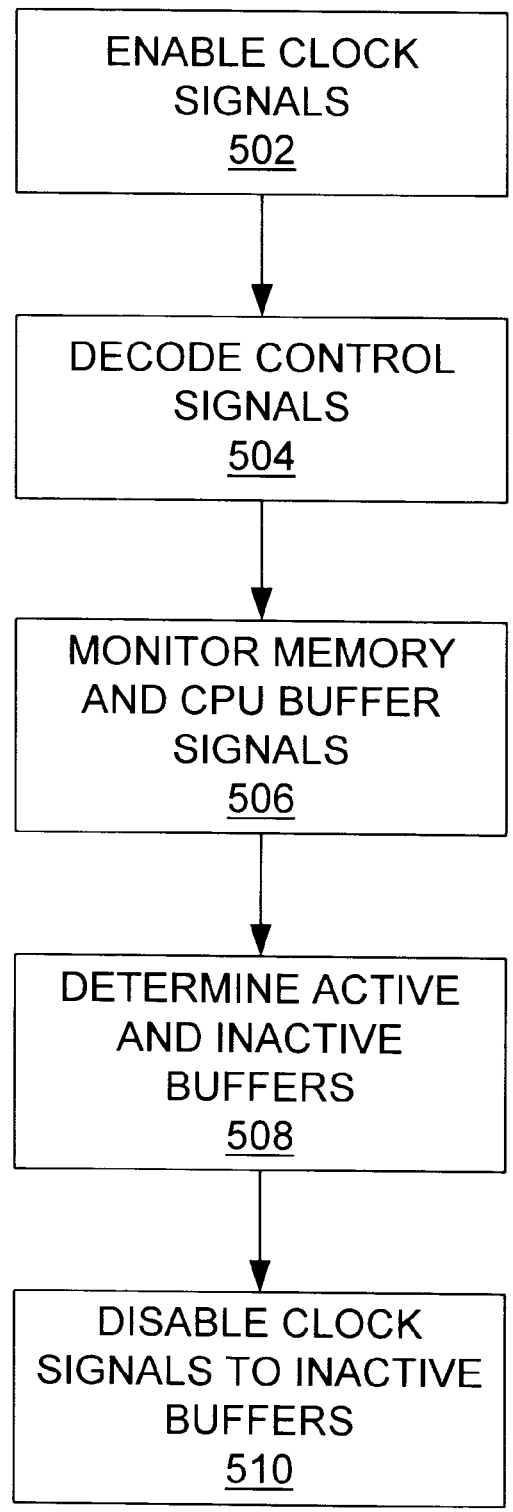
FIG. 5 is a flowchart illustrating the operation of a bus bridge according to one embodiment of the present invention.

Turning now to FIG. 5, a flowchart diagram of a method for data bus interface power management is shown. In step 502, the clock signals of a plurality of data buffers are enabled. In one embodiment, the data buffers store data that is received from a data bus or store data to be transmitted on the data bus. In step 504, the control signals of the data bus are decoded to determine when a bus cycle begins. The control signals are additionally used to determine which buffers are active during that bus cycle. In step 506, memory and CPU buffer signals are monitored to determine which buffers are being accessed by the memory or the CPU. In step 508, the active buffers within the bus interface unit are determined from the data bus control signals and the memory and CPU buffer signals. In step 510, the clock signals of inactive buffers are disabled, thereby reducing the power consumption of the bus interface unit.

Numerous variations and modifications will become apparent to those skilled in the art once the above disclosure is fully appreciated. It is intended that the following claims be interpreted to embrace all such variations and modifications.

What is claimed is:

1. A bus interface unit coupled to a data transfer bus comprising:
   a first buffer coupled to said data transfer bus, configured to receive data from a device coupled to said data transfer bus and to store said data for retrieval by a processing core;
   a second buffer coupled to said data transfer bus, configured to receive data from said processing core and store said data for retrieval by a device coupled to said data transfer bus;
   a clock unit coupled to said data transfer bus, said first buffer and said second buffer, wherein said clock unit is configured to output a first clock signal to said first data buffer and a second clock signal to said second data buffer, to selectively disable said first clock signal when said first buffer is inactive, to selectively disable said second clock signal when said second buffer is inactive, to selectively enable said first clock signal when said first buffer is active, and to selectively enable said second clock signal when said second buffer is active.

2. The bus interface unit of claim 1 further comprising:
   a third buffer coupled to said data transfer bus, configured to receive data from a device coupled to said data transfer bus and to store said data until said data is stored in a memory;
   a fourth buffer coupled to said data transfer bus, configured to receive data from said memory and store said data for retrieval by a device coupled to said data transfer bus;
   wherein said clock unit is configured to output a third clock signal to said third data buffer and a fourth clock signal to a fourth data buffer, and configured to selectively disable said third clock signal when said third buffer is inactive, to selectively disable said fourth clock signal when said fourth buffer is inactive, to selectively enable said third clock signal when said third buffer is active and to selectively enable said fourth clock signal when said fourth buffer is active.

3. The bus interface unit of claim 1 wherein said first and second buffers are first-in/first-out buffers.

4. The bus interface unit of claim 1 further comprising a state machine coupled to said data transfer bus and said clock unit, wherein said state machine is configured to determine which of said buffers are inactive and convey a signal to said clock unit identifying said inactive buffers.

5. The bus interface unit of claim 1 wherein all said clock signals are enabled at the beginning of a bus cycle and said clock signals associated with said inactive buffers are disabled after a type of bus cycle is determined.

6. The bus interface unit of claim 1 wherein said data transfer bus is a peripheral component interconnect (PCI) bus.

7. The bus interface unit of claim 6 wherein said clock signals associated with said buffers configured to receive data from said data transfer bus are disabled during a write transaction.

8. The bus interface unit of claim 1 wherein a plurality of data producing or data consuming peripheral devices are coupled to said data transfer bus, wherein said data producing peripheral devices generate said data stored in said first buffer and said data consuming peripheral devices retrieve said data stored in said second buffer.

9. A computer system comprising:
a central processing unit coupled to a local bus;
a cache coupled to said local bus;
a bus interface unit coupled to said local bus and a data transfer bus wherein said bus interface unit includes:
  a first buffer coupled to said data transfer bus, configured to receive data from a device coupled to said data transfer bus and to store said data for retrieval by a processing core;
  a second buffer coupled to said data transfer bus, configured to receive data from said processing core and store said data for retrieval by a device coupled to said data transfer bus; and
  a clock unit coupled to said data transfer bus, said first buffer and said second buffer, wherein said clock unit is configured to output a first clock signal to said first data buffer and a second clock signal to said second data buffer, and configured to selectively disable said first clock signal when said first buffer is inactive, to selectively disable said second clock signal when said second buffer is inactive, to selectively enable said first clock signal when said first buffer is active, and to selectively enable said second clock signal when said second buffer is active;
a memory coupled to said bus interface unit.

10. The computer system of claim 9 further comprising:
a third buffer coupled to said data transfer bus, configured to receive data from a device coupled to said data transfer bus and to store said data until said data is stored in a memory;
a fourth buffer coupled to said data transfer bus, configured to receive data from said memory and store said data for retrieval by a device coupled to said data transfer bus;
wherein said clock unit is configured to output a third clock signal to said third data buffer and a fourth clock signal to a fourth data buffer, and configured to selectively disable said third clock signal when said third buffer is inactive, to selectively disable said fourth clock signal when said fourth buffer is inactive, to selectively enable said third clock signal when said third buffer is active and to selectively enable said fourth clock signal when said fourth buffer is active.

11. The computer system of claim 9 wherein said first and second buffers are first-in/first-out buffers.

12. The computer system of claim 9 further comprising a state machine coupled to said data transfer bus and said clock unit, wherein said state machine is configured to determine which of said buffers are inactive and convey a signal to said clock unit identifying said inactive buffers.

13. The computer system of claim 9 wherein all said clock signals are enabled at the beginning of a bus cycle and said clock signals associated with said inactive buffers are disabled after a type of bus cycle is determined.

14. The computer system of claim 9 wherein said data transfer bus is a peripheral component interconnect (PCI) bus.

15. The computer system of claim 14 wherein said clock signals associated with said buffers configured to receive data from said data transfer bus are disabled during a write transaction.

16. The computer system of claim 9 wherein a plurality of data producing or data consuming peripheral devices are coupled to said data transfer bus, wherein said data producing peripheral devices generate said data stored in said first buffer and said data consuming peripheral devices retrieve said data stored in said second buffer.

17. A method of reducing power dissipation in a bus interface unit coupled to a data transfer bus comprising:
enabling clock signals to a plurality of transmit and receive buffers at the beginning of a bus cycle of said data transfer bus;
decoding control signals of said data transfer bus to determine a cycle type of said bus cycle;
determining which of said plurality of transmit and receive buffers are inactive during said bus cycle;
disabling clocks signals to said transmit and receive buffers that are inactive during said bus cycle.

18. The method of reducing power dissipation of claim 17 wherein said bus interface unit includes two transmit buffers and two receive buffers.

19. The method of reducing power dissipation of claim 18 wherein a first transmit buffer and a first receive buffer are coupled between a processing core and said data transfer bus, and a second transmit buffer and a second receive buffer are coupled between a memory and said data transfer bus.

20. The method of reducing power dissipation of claim 17 wherein said data transfer bus is a peripheral component interconnect (PCI) bus.

21. The method of reducing power dissipation of claim 20 wherein said bus interface unit monitors a bus grant signal to determine the start of a bus cycle.

22. The method of reducing power dissipation of claim 21 wherein said bus interface unit monitors a frame and device ready signal to determine the end of a bus cycle.

23. The method of reducing power dissipation of claim 22 wherein said bus interface unit monitors a bus command signal to determine said bus cycle type.

* * * * *